United States Patent [19]
Abendroth

[11] 3,826,486
[45] July 30, 1974

[54] SHEET CONVEYOR MECHANISM FOR PRINTING MACHINES
[75] Inventor: Paul Abendroth, Offenbach/Main, Germany
[73] Assignee: Roland Offsetmaschinenfabrik Faber & Schleicher AG
[22] Filed: Nov. 24, 1972
[21] Appl. No.: 309,172

[30] Foreign Application Priority Data
Nov. 23, 1971 Germany............................ 2157993

[52] U.S. Cl. ............................................... 271/204
[51] Int. Cl. ........................................... B65h 29/04
[58] Field of Search ............. 271/79, 82, 50, 53, 75, 271/76, 204, 206; 198/180; 101/232

[56] References Cited
UNITED STATES PATENTS
2,198,385   4/1940   Harrold................................. 271/79
3,389,657   6/1968   Schwabach...................... 271/50 X
3,682,472   8/1972   Barthel................................ 271/53

Primary Examiner—Evon C. Blunk
Assistant Examiner—Bruce H. Stoner, Jr.
Attorney, Agent, or Firm—Wolfe, Hubbard, Leydig, Voit & Osann, Ltd.

[57] ABSTRACT

A printing press sheet conveyor having a pair of endless chains mounted for movement around drive sprockets and a plurality of gripper carriages carried between said chains for receiving and transporting sheets between one transfer station adjacent a pair of said sprockets to a remote transfer station. The gripper carriages each include a shaft with a plurality of gripping pads and a corresponding number of grippers mounted for coaction with the pads. The gripper pads of each carriage are of progressively decreasing height from the ends of the shaft to the center thereof so that when the shaft is conveyed around chain support sprockets at a transfer station and deflects slightly outwardly due to the resulting centrifugal forces exerted on the shaft the bearing pads rise to a substantially common level for uniformly receiving a sheet at the transfer station. There is also disclosed an efficient method for producing a gripper carriage with gripper pads of such progressively different heights.

4 Claims, 7 Drawing Figures

SHEET CONVEYOR MECHANISM FOR PRINTING MACHINES

DESCRIPTION OF THE INVENTION

The present invention relates generally to conveyor mechanisms for transferring sheets in a printing press and to a method of manufacturing such conveyor mechanisms. More particularly, the invention relates to sheet conveyor mechanisms of the type having a pair of parallel endless chains which are disposed about appropriate drive sprockets and support a plurality of gripper carriages therebetween at regularly spaced intervals for receiving successive sheets from an impression cylinder and transporting them to a transfer station some distance away.

In such conveyor mechanisms, the gripper carriages each include a plurality of coacting grippers and gripper pads mounted across the gripper carriage for engaging a sheet to be transferred. The gripper pads in the conveyor mechanism and the gripper pads of the impression cylinder from which a sheet is to be received must be parallel during the transfer of the sheet and provide a definite gap between each other in order to avoid marking or tearing of the sheets. In modern high speed printing machines, centrifugal forces exerted on the gripper carriages as they travel around the chain support sprockets at a transfer station cause an outward bowing of the carriages which changes the effective height of the gripper pads. The pads at the center portion of the carriage are moved outwardly the most from such bowing and tend to mar and tear the sheets as they come into contact with them. The forces exerted on the sheet at that time further tend to disorient the register of the sheets. Heretofore, attempts have been made to overcome the bowing of the gripper carriages by providing center guide supports for restraining the gripper carriage against outward movement, and such an arrangement is shown in U.S. Pat. No. 2,198,385. These constructions, however, have been relatively complicated and expensive to manufacture.

Acocrdingly, it is an object of the present invention to provide an improved printing press sheet conveyor arrangement which is simple and inexpensive in construction and which overcomes the disadvantages that have heretofore resulted from outward bowing of the gripper carriages as they travel around the sprocket drive wheels.

Another object is to provide a novel and efficient method of manufacturing a gripper carriage used in a sheet conveyor mechanism of the above kind.

Other objects and advantages of the invention will become apparent upon reading the attached detailed description and upon reference to the drawings in which.

Figure 1:
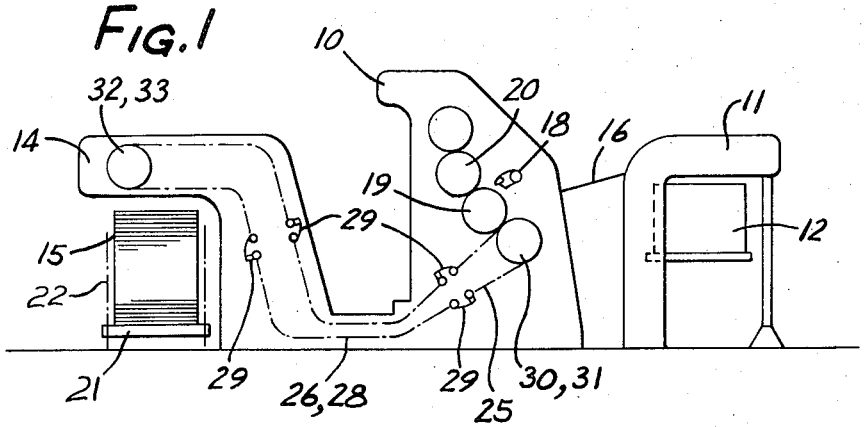
FIG. 1 is a diagrammatic side elevational view of a printing press with a sheet conveyor mechanism embodying the present invention.

While the invention is susceptible of various modifications and alternative constructions, a certain illustrative embodiment thereof has been shown in the drawings will be described below in detail. It should be understood, however, that there is no intention to limit the invention to the specific form disclosed, but, on the contrary, the intention is to cover all modifications, alternative constructions, and equivalents falling within the spirit and scope of the invention.

Turning now more particularly to FIG. 1 of the drawings, there is shown a printing press 10 having a feeder mechanism 11 on one side thereof containing a stack 12, of sheets of paper or the like to be printed and a delivery mechanism 14 on the other side positioned directly over a stack 15 of printed sheets. The sheets to be printed are taken from the stack 12 by the feeder mechanism 11 and forwarded to an inclined feed board 16 where they slide to a predetermined position. From the feed board 16, a swing gripper 18 of a known type, partially shown in FIG. 1, successively, transfers the sheets to an impression cylinder 19 where each sheet is engaged by appropriate grippers in a conventional manner. The sheets then pass between the impression cylinder 19 and the printing cylinder 20 to effect the printing operation. The sheets continue around impression cylinder 19 after printing to a position where they are transferred to a conveyor 25. The conveyor 25 includes a pair of endless conveyor chains 26, 28, diagrammatically indicated by a dot-dash line in FIG. 1, which support a plurality of gripper carriages 29 therebetween for successively receiving the sheets from the impression cylinder 19 and transferring them to the delivery mechanism 14 above the delivery stack 15. The chains 26, 28 are trained around appropriate sprockets, only two pairs 30, 31 and 32, 33 of which are shown in FIG. 1, and are driven at "press speed" by drive means, not shown. The delivery mechanism 14 receives the printed sheets from the conveyor 25 and places it on the delivery stack 15. The delivery stack 15 in this case is supported on a platform 21 suspended by chains diagrammatically indicated at 22 which may have known means for progressively being lowered so as to maintain the top of the stack at a given predetermined position with respect to the conveyor and delivery mechanism. It will be understood that the feeder and delivery mechanisms 11, 14 both may be of conventional types.

Figure 2:
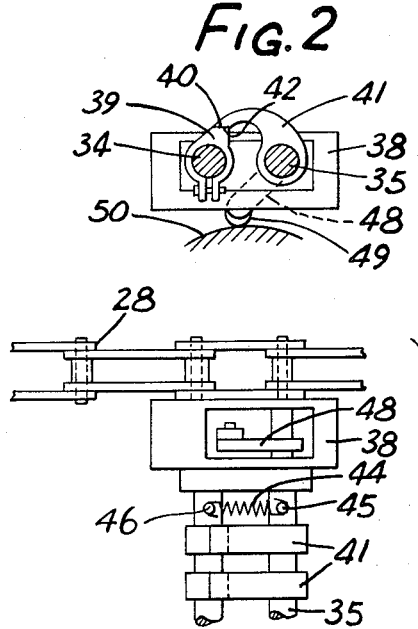
FIG. 2 is a cross sectional view of one of the gripper carriages of the conveyor mechanism shown in FIG. 1, showing its cooperation with a gripper actuating cam at one of the transfer positions.
Figure 3:
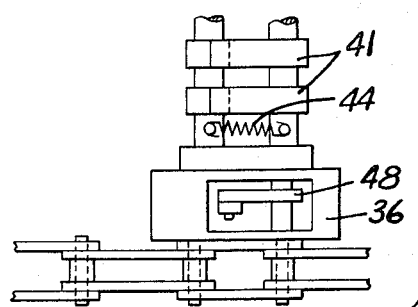
FIG. 3 is a top view of the gripper carriage shown in FIG. 2.
Figure 4:
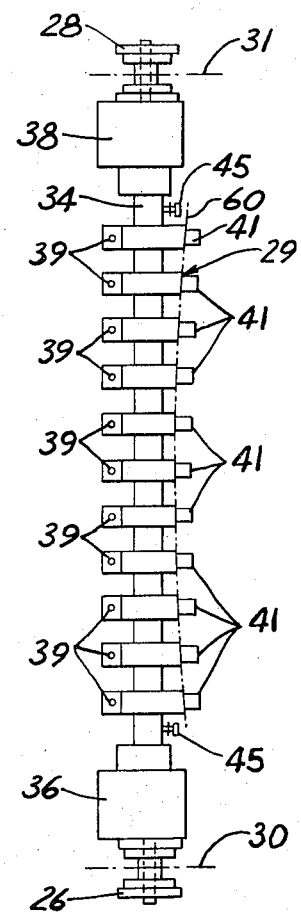
FIG. 4 is a front elevational view, reduced in scale, of the gripper carriage shown in FIG. 3.

The conveyor gripper carriages 29 supported between the chains 26, 28 in this case each include a pair of shafts 34, 35 supported at their ends by brackets 36, 38 secured to opposite links of the chains 26, 28, as best shown in FIGS. 2-4. The shaft 34 is rigidly supported by the brackets 36, 38, while the opposite shaft 35 is pivotally mounted therein. The rigid shaft 34 carries a series of spaced gripper pads 39 that are clamped to the shaft, and each gripper pad 39 is formed with a gripper bearing surface 40 substantially parallel to the line of movement of that portion of the chain on which it is mounted. The pivotable shaft 35 supports a like number of correspondingly spaced grippers 41 which act in conjunction with the gripper pads 39 to grip the forward edge of a sheet to be transferred. Each gripper 41 is formed with an integral bearing surface 42 adapted to engage the bearing surface 40 of the respective gripper pad 39. To hold the grippers 41 in a normally closed position against the pads 39, tension spring 44 connected between the shafts 34, 35 through pins 45, 46 tend to rotate the pivotable shaft 35 in a counterclockwise direction as viewed in FIG. 2.

In order to move the grippers 41 to an open sheet receiving and releasing position, an arm 48 with a cam roller 49 at its outer end is secured at opposite ends of the pivotable shaft 35. Fixed cams 50, one of which is diagrammatically illustrated in FIG. 2, are provided at each sheet transfer station to actuate the cam arms 48. The cams 50 may be appropriately designed to cause the arms 48 and the attached respective grippers 41 to be rotated in a clockwise direction, as viewed in FIG. 2, against the bias of the springs 44 to an open position, and at a determined point permit the grippers 41 to return to their closed position under the force of the tensioned springs. Thus, the grippers 41 are thrown to open and closed positions at proper times at each transfer station to effect the desired release and engagement of a sheet.

Figure 5:
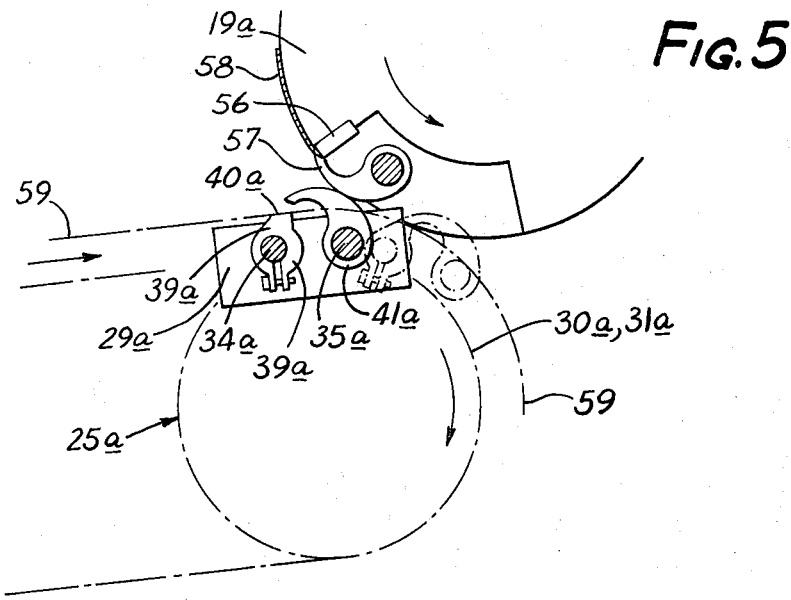
FIG. 5 is a fragmentary vertical section view showing a typical transfer of a sheet from an impression cylinder to a conventional conveyor mechanism.

In conventional conveyors of the type heretofore known, the transfer of a sheet from an impression cylinder to the conveyor frequently takes place in the manner illustrated in FIG. 5 wherein parts similar to those described above have been designated with like reference numerals with the distinguishing suffix "a" added. The impression cylinder 19a in this case has gripping pads 56 and spring biased rotatable grippers 57 adapted to hold the forward edge of a sheet 58 firmly in place against the pads 56. The operation of the conveyor 25a is timed such that the gripper carriage 29a arrives at the position for transfer simultaneously with the cylinder gripper 56. As the gripper carriage 29a approaches the impression cylinder 19a in a linear motion following the path indicated by the line 59, the grippers 41a begin to open to a sheet receiving position, shown in solid lines in FIG. 5. The direction of movement of the gripper carriage 29a is reversed as the carriage reaches the impression cylinder and proceeds around the sprocket wheels 30a, 31a. At this point, bearing surfaces 40a of the gripper pads 39a should move along a line tangent to the impression cylinder 19a, and the gripper pads 39a should be spaced from the gripper pads 56 of the impression cylinder 19a a distance equal to the thickness of the sheet to be printed so that engagement of the sheet by the carriage grippers 41a and disengagement thereof by the cylinder grippers 57 takes place smoothly. Due to the centrifugal force exerted on the gripper carriage 29a as it travels around the sprocket wheels 30a, 31a, however, the shaft 34a carrying the gripper pads 39a will deflect and the gripper pads in the center portion thereof take a raised position, as shown in dashed lines in FIG. 5, so that the bearing surface 40a extends above the intended line of travel 59. In conventional conveyor arrangements, this raising of the central gripping pads 39a frequently causes them to engage the paper sheet with such force that the sheet is torn or marked, or the register of the sheet is disoriented.

In accordance with the present invention, the gripper pads of each gripper carriage are formed with progressively decreasing heights from the outside ends of the carriage to the center thereof so that when the carriage proceeds around chain support sprockets at a transfer station the deflection of the carriage shaft from the centrifugal forces acting upon it causes the gripper pads to raise to a substantially common level for receiving a sheet. As shown in FIG. 4, the gripper pads 39 of the carriage 29 are of a height which progressively decreases across the width of the gripper from the ends to the center so that the bearing surfaces 40 of the pads 39 form a generally curved line 60. The bearing surface line 60 preferably should correspond substantially to the bending line of the shaft 34 when subjected to the maximum centrifugal force it will experience when proceeding around chain support sprockets at a transfer station during operation of the conveyor at press speed. Such a bending line may be determined by one skilled in the art through an appropriate stress analysis of the shaft 34, taking into consideration the specific data of the conveyor system within which it is to be incorporated, such as the diameter of the sprocket wheels, the speed of the press, and the mass of the gripper carriage. In order to facilitate the determination of a suitable bending line, a cantilever beam corresponding to the shaft 34 may be supported at opposite ends and uniformly loaded over its entire length so as to exert a force on the beam of a magnitude equal to the centrifugal force exerted on the gripper pad shaft during a transfer operation. Alternatively, the bending line may be approximated by loading such a cantilever beam at its center with a concentrated force, or by loading it with several symmetrically acting forces. In each case, the total force on the beam should correspond to the maximum centrifugal force that would act on the shaft 34 as it proceeds around a sprocket at a transfer station.

In the operation of a conveyor having gripper carriages of the present invention, as each gripper carriage travels around chain support sprockets at a transfer station, the bearing surfaces 40 of the gripper pads 39 will raise to a substantially common level due to the deflection of the gripper carriage shaft 34 resulting from the centrifugal forces exerted on the shaft. As the gripper pad bearing surfaces 40 pass by the impression cylinder 19, the line of the bearing surfaces preferably should be spaced from the impression cylinder a distance equal to the thickness of the sheet being transferred so that the bearing pad surfaces 40 come into uniform engagement with the sheet for the exchange. It will be appreciated that after a gripper carriage has reversed direction about the sprockets and is again moving in a linear direction, the gripper carriage shaft will return to its original undeflected shape with the gripper pad bearing surfaces defining a generally curved line. Such condition, however, does not harm the sheets being conveyed by the carriage, and the gripper pads will again move to a substantially common plane as the carriage proceeds about sprockets at the next transfer station. Moreover, the different degrees of deflection that may result from different machine speeds also has been found not to adversely affect a transfer of a sheet so long as the height differences of the gripper pads are designed in accordance with the bending line resulting from the maximum centrifugal force that may be incurred during operation of the conveyor.

Figure 6:
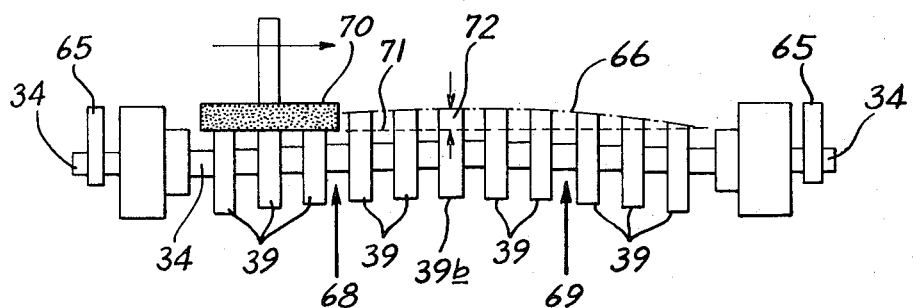
FIG. 6 is a plan view showing a gripper carriage being machined according to the method of the present invention.

In keeping with the invention, there is provided a novel and efficient method of manufacturing the gripper carriages 29. Such method is illustrated in FIGS. 6 and 7 of the drawings, wherein like reference numerals designate parts similar to those described above. First a plurality of bearing pads 39 of equal size are mounted upon a carriage shaft 34 in spaced relation. The gripper carriage shaft 34 is then supported and secured at its opposite ends in holders 65 of an appropriate metal cutting machine, such as a grinding machine. Forces are symmetrically applied to the gripper carriage shaft 34 between the points of support so that the shaft is deflected in such manner that the heights of the gripper pads 39, as seen across the width of the shaft, increase from both outside ends to the center of the shaft according to the bending line 66. In the illustrated process, two equal forces 68, 69 are applied to the shaft, although, a greater number of symmetrically applied forces can be utilized, or alternatively a single force can be applied to the center of the shaft. In either case, the forces applied to the shaft should total the maximum centrifugal force the gripper carriage shaft will experinece during its intended operation in a conveyor system.

Figure 7:
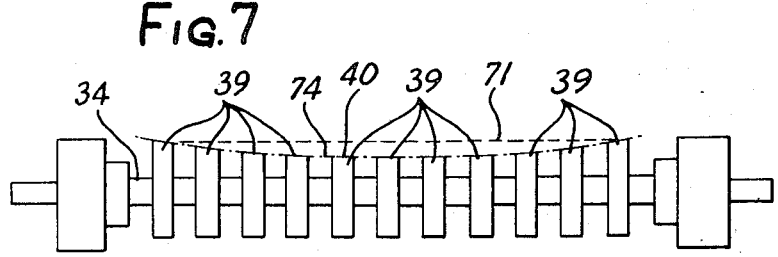
FIG. 7 is a plan view of a gripper carriage after completion of the machining process shown in FIG. 6.

After application of the forces to the shaft, the gripping pads are machined, such as by a grinding wheel 70, along linear path 71 across the gripper pads the entire length of the shaft 34 so that the pads 39 are ground in progressively greater amounts from the end of the shaft to the center and then in lesser amounts from the center of the shaft to the other end. It can be seen that the maximum amount 72 is removed from the center bearing pad 39b. After the machine operation, the forces 68, 69 are released to permit the gripper carriage shaft 37 to return to its original undeflected position whereby the gripper pad bearing surfaces 40 define a symmetrical inwardly curved line 74, as shown in FIG. 7.

It will be appreciated that the method of the present invention eliminates the need for computing the bending line, and thus the height of each individual gripper pads, as well as illuminating the necessity of programming a machine tool to provide a contouring machining operation. It is only necessary to determine the maximum centrifugal force exerted on the gripper carriage shaft during operation of the conveyor, apply that force to the shaft while supported and secured at opposite ends, and machine in a straight path across the gripper pads along the length of the shaft. The desired height differences are automatically obtained as soon as the force is released.

What is claimed is:

1. In a printing press sheet conveyor having a pair of endless chains supported by sprockets with a plurality of spaced gripper carriages carried between said chains for receiving and transporting sheets from oe transfer station adjacent a pair of said sprockets to a remote transfer station, said gripper carriages each comprising a shaft having a plurality of gripper pads, a plurality of grippers mounted on said carriage for coaction with said gripper pads to engage sheets to be transported, and said gripper pads being of progressively decreasing height from the ends of said shaft to the center thereof.

2. In the conveyor of claim 1 in which said gripper pads decrease in height according to a line which corresponds to the bending line of said shaft when subjected to the maximum centrifugal force experienced when the shaft is moved about said chain support sprockets during a sheet transfer operation.

3. In the conveyor of claim 1 in which said gripper carriage pads decrease in height according to a line which corresponds with the bending line of said shaft when supported at its ends and subjected to a symmetrically applied load which exerts a force equal to the maximum centrifugal force exerted on said shaft when moved about said chain support sprockets during a sheet transfer operation.

4. In the conveyor of claim 1 in which said shaft is outwardly bendable when moved around chain support sprockets at a sheet transfer station due to the centrifugal forces acting on said shaft, said gripper pads each being formed with a flat bearing surface of decreasing height such that when said shaft bends outwardly at a transfer station said gripper pad bearing surfaces rise to form a substantially straight line.

* * * * *